April 29, 1969  E. H. DINGER  3,441,825
SELECTED GAIN CONTROL SYSTEM
Filed Nov. 29, 1965  Sheet 1 of 3

INVENTOR.
EDWARD H. DINGER
BY W. J. Shanley, Jr.
HIS ATTORNEY

INVENTOR.
EDWARD H. DINGER

United States Patent Office 3,441,825
Patented Apr. 29, 1969

3,441,825
SELECTED GAIN CONTROL SYSTEM
Edward H. Dinger, Waynesboro, Va., assignor to General Electric Company, a corporation of New York
Filed Nov. 29, 1965, Ser. No. 528,319
Int. Cl. H02p 5/12, 7/58
U.S. Cl. 318—313         11 Claims

ABSTRACT OF THE DISCLOSURE

A feedback control system having nonlinear system gain with a selected number of gains for different amounts of detected error is described. The control signal of the system is both a rate of change command developed by a capacitor subjected to different charge and discharge rates depending upon the amount of error and also a lead command, i.e., a step voltage wave, to overcome inertia and obtain quick response of the machine being controlled.

---

The present invention relates to an improved feedback control system, and in particular to a system in which on-off or other nonlinear actuating signals are employed.

In controlling the operation of processes and machines, it is desirable to maintain control system stability even while providing correction for large variations in performance. It has been recognized that by selecting a control system which produces a rate of change command, i.e., where the control signal is the integral of a representation of the error, one step toward achieving a stable control system has been taken. The problem encountered with such a system, however, is the complexity caused by the need to provide a sufficient number of control rates to guide the system controlled when large variations in performance are encountered.

It is accordingly an object of the present invention to provide a rate of change control system having a selected number of control rates.

The complexity of a rate of change control system may be greatly alleviated by the use of nonlinear selection of the different rate of change control signals. Such a control system, for example, may include a plurality of switches each actuating a different gain for the integrating amplifier for a given zone of deviation or system error.

It is thus another object of the present invention to provide a feedback control system having nonlinear system gain.

A further object is to provide a feedback control system wherein system gain is selected for different ranges of deviation of the controlled system from normal operation.

Another object is to provide a feedback control system producing a rate of change correction signal in which the rate of change is different for different ranges of deviation of the controlled system from normal operation.

Machines controlled by a feedback control system may have inertia which must be overcome when fast correction is required. A further object of the present invention is, therefore, to provide a feedback control system having a system gain that is selected for different ranges of deviation of the controlled machine from normal operation in which a lead control signal is generated for each range to overcome the inertia of the machine controlled.

Another object of this invention is to provide a feedback control system capable of sensing the system drive to insure that the control signal generated continues to change only when the system drive is following.

Other objects and advantages of the present invention will be more readily understood from a detailed explanation of an embodiment of the invention used in a motor controlled winding system which is chosen by way of example and illustrated in the drawings, in which.

Figure 1:
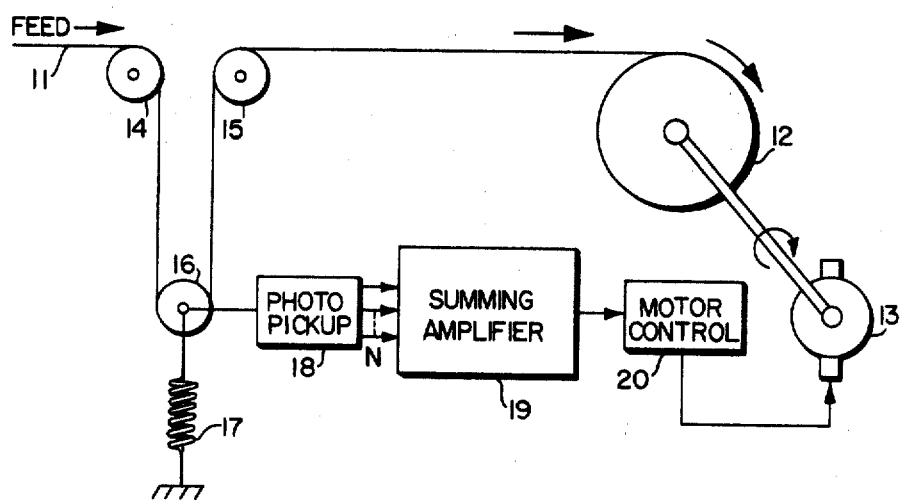
FIGURE 1 shows a windup system with feedback control.

Referring now to the figures wherein like reference numerals refer to like parts throughout, there is shown in FIGURE 1 a winding system including a windup drum 12 driven by a motor 13 to wind a material 11 which is supplied at a constant rate from a feed source indicated at the left of the figure. Rollers 14 and 15 in cooperation with spring biased roller 16 serve to maintain tension on the material being wound. Roller 16, biased by spring 17, dances up and down to pick up the slack in the material as the windup speed varies from the feed rate. The position of this roller, often called the dancer roll, provides an indication of the windup speed which may be sensed by a pickup, such as a photo pickup 18. An example of this pickup is discussed more fully with regard to FIGURE 2 below. The N outputs of photo pickup 18, where N is any integer, are supplied to summing amplifier 19, a preamplification stage for the motor control 20. The motor control, in turn, regulates the speed of drive motor 13.

While drive motor 13 is shown as a DC motor in FIGURE 1, it may as readily be an AC motor, a hydraulic or pneumatic motor or any other drive means desired.

Figure 2:
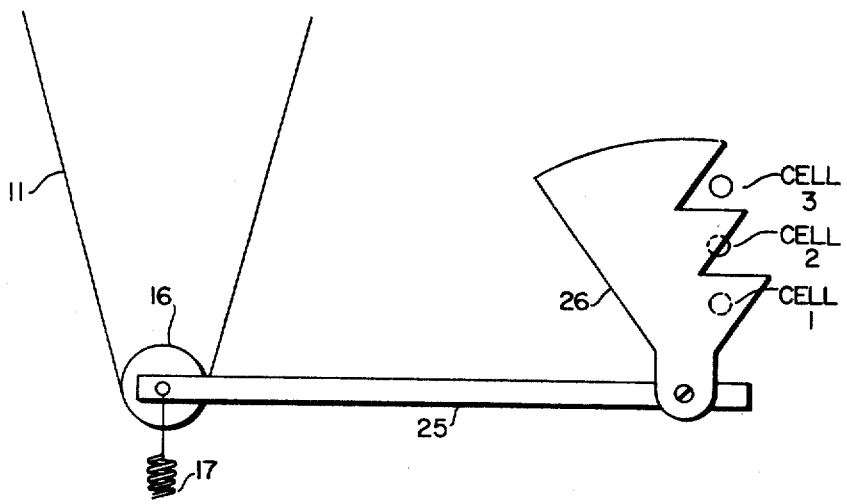
FIGURE 2 illustrates a photocell switch which may be used in the system of FIGURE 1.

FIGURE 2 illustrates a photo pickup which may be used with the winding system shown in FIGURE 1. Here, an arm 25 is connected to the dancer roll and supports a shutter 26. As the dancer roll moves up, the shutter will rotate clockwise to cover the photocells, indicated cell 1, cell 2, and cell 3, in that order. When the dancer roll 16 moves down, the shutter rotates counterclockwise to uncover the cells. Shutter 26 is designated so that the photocells can be covered one at a time. As may be noted from FIGURE 1, when the speed of windup drum 12 exceeds the feed rate, dancer roll 16 is pulled up and when the speed of motor drive 13 is lowered, tension on material 11 is lessened and the dancer roll moves downward.

It should be understood that while the description that follows makes reference to the use of photoelectric cells, any nonlinear control element or on-off switch may be used.

Figure 3:
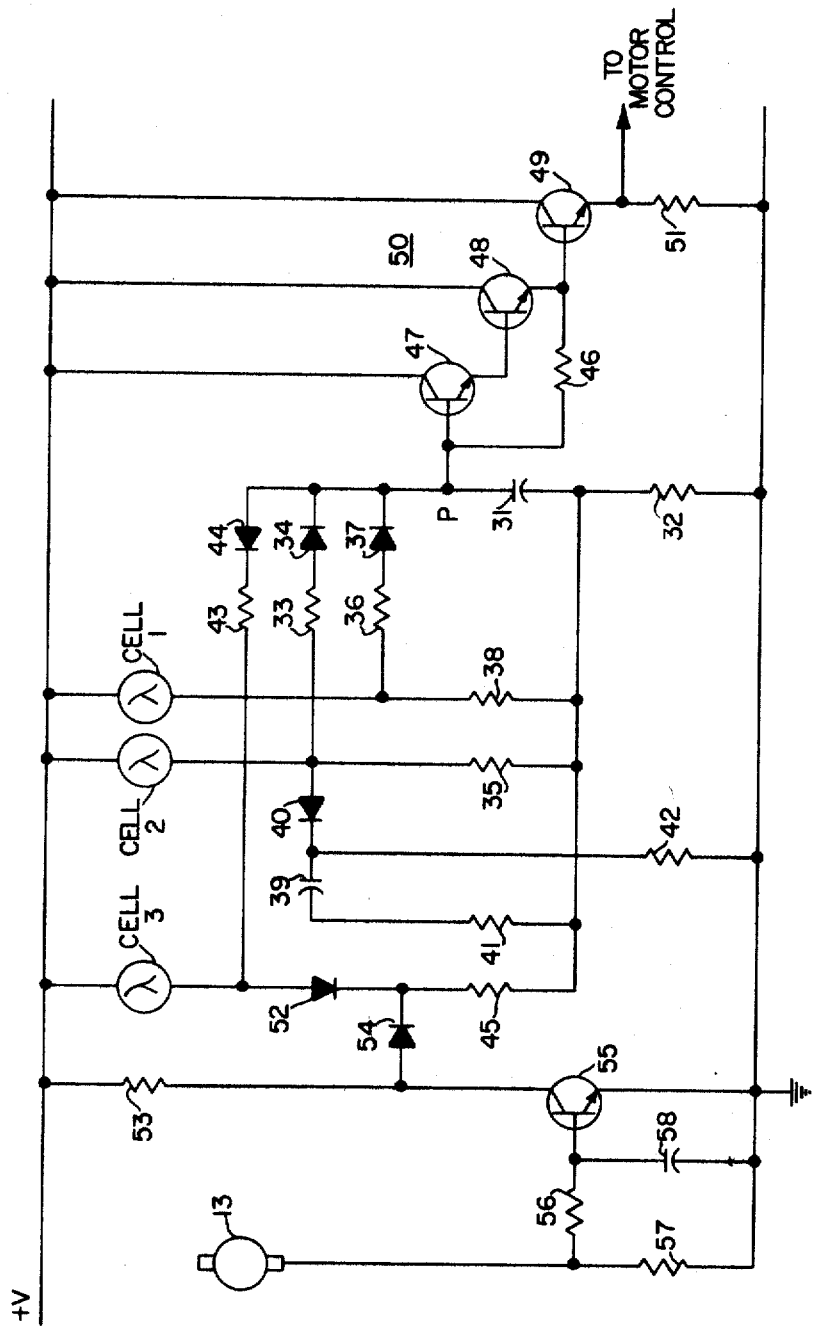
FIGURE 3 is a circuit diagram of the summing amplifier with photo pickup as used in the system of FIGURE 1.

FIGURE 3 shows photoelectric cells 1, 2, and 3 in circuit relationship with the reference generator. These cells control the charging and discharging of capacitor 31. This energy storage means may be charged under the control of cell 2 via resistor 33 and diode 34, or under the control of cell 1 via resistor 36 and diode 37. Resistor 43 and diode 44 in conjunction with diode 52 and resistor 45 provide a path for discharging capacitor 31, which action is set in motion when the switch represented by cell 3 is open. The photocells are thus switching means connecting or disconnecting the power supply +V to capacitor 31 via respective charging or discharging paths, and the voltage across this energy storage means changes at a rate depending upon the value of the resistors in the charge or discharge path.

The above description points up a difference between cell operation during charge and discharge of capacitor 31. Charging takes place when cell 2 or cells 1 and 2 are closed, i.e., a low impedance or conducting state. The discharge of energy from this storage device, however, requires cell 3 to be open, a high impedance, nonconducting state, and, because of the design of shutter 26 and its relation to the cells, cells 1 and 2 are also open at this time.

Associated with each of the photocells is another path for creating a reference signal. Resistors 45 and 32 form a voltage divider controlled by cell 3. When this cell is uncovered, a portion of the voltage from supply +V immediately appears across resistor 32. This voltage raises the potential at point P and, except for the voltage drops caused by the base-emitter diodes of transistors 47, 48 and 49, for steady state conditions, this voltage appears as a step or lead control voltage across the output resistor 51. Transistors 47, 48, and 49 form a high gain current amplifier 50 supplying a replica of the signal appearing at the base of transistor 47 to the load which may be a motor control, as indicated in FIGURE 3. As cell 2 is uncovered, the voltage at point P is raised by the divider action of resistor 35 with resistor 32. The effect is repeated as cell 1 is uncovered and resistor 38 is placed in parallel with resistors 35 and 45. Each cell thus aids in the generation of a lead control signal which is coupled in series with the rate of change control signal by resistor 32, a resistor common to the three dividers. Because the voltage divider associated with each cell instantly produces a voltage which appears at point P, this contribution to the control signal constitutes a lead signal which aids in overcoming the inertia of some systems controlled as in the winding system example.

It should be noted that capacitor 31 is the center of activity in summing amplifier 19. The voltage at point P in fact represents the sum or contribution from each of the inputs from the three photocells. If, then, a standard feedback control system be envisioned, the feedback signal (dancer roll position) is compared with a reference (the dancer roll position for desired speed and material tension) and the deviation or error signal causes different ones of a plurality of switch means to be activated depending upon the zone of variation encountered. Each switch means provides a different rate of charge transfer to or from capacitor 31, thereby causing summing amplifier 19 to have a different gain for each different range of error provided for. The various inputs or actuating signals are combined by the amplifier to produce a single command or correction signal.

The circuits controlled by each of the switches contribute a unique function in the generation of a control signal. Photocells 1 and 3, as has been discussed above, respectively provide for the fast charge and discharge of capacitor 31 in instances of erratic system operation, while photocell 2 is operative in the narrow range of normal system operation. The normal range of system operation, e.g., the windup speed is substantially equal to the feed rate, is an area of slow change and requires a slow charge or discharge to maintain this equilibrium. This is provided by the long time constant of resistor 33 with capacitor 31 during charging and by a large resistor 46 in conjunction with capacitor 31 at discharge. The discharge path provided by resistor 46 operates continuously, independent of inputs from the photocells. Its effect, however, is felt most strongly when cells 1 and 2 are covered and cell 3 remains uncovered. At this time, the charge paths and the discharge path controlled by the cells are disengaged and the rate of change control signal is attributed primarily to the discharge path of resistor 46 and also the minimal amount of current drain into the base of transistors 47.

The rate of change command generated under the control of cell 2 is such that if a center line of speed for normal operation be imagined, energy is stored and drained at a rate that differs from this imagined line by only slight amounts. Since it is desirable to follow this imagined normal operation line as closely as possible, a quickening function has been introduced into the charge cycle to more accurately compensate for the inertia of the windup. Capacitor 39 and resistor 41 differentiates the voltage step occasioned by the switching on of cell 2 to provide a spike of voltage across resistor 32 at the same time the step or lead signal from resistors 35 and 32 is generated. Capacitor 39, resistor 41 and resistor 42 (the latter resistor providing the discharge path for capacitor 39) are chosen so that the voltage spike occasioned by these components is sufficient to overcome the inertia of the drive and then to decay at much the same rate as the inertia of the system allows the motor 13 to respond to the change commanded.

When all the cells are covered and a slowdown of motor 13 is commanded by the drain of energy from capacitor 31, it is possible for the inertia of the system to prevent motor 13 from following the control signal from the summing amplifier and for a lag between command and response to develop. When this happens, the dancer roll does not drop to uncover cell 3 and the discharge continues. In the absence of a driving control signal and when the inertia of the system has been overcome, the motor speed will fall off sharply to the now too low control signal level. Because of this and the constant material feed in the windup system, the material will begin to pile up because the windup drum is not moving fast enough to receive it. To prevent such a situation, the armature current of motor 13 is monitored, develops a voltage across resistor 57 and used to trigger transistor switch 55. This irregular signal from the armature is filtered by resistor 56 and capacitor 58. When capacitor 31 discharges at a rate that is too high to be followed by the motor 13 because of the inertia of the windup drum, the armature current of the motor falls to zero and transistor 55 is switched off. Little voltage is now dropped across resistor 53 and the voltage at the anode of diode 54 is up and diode 52 is back biased preventing further discharge current from flowing. When the inertia is overcome and the motor 13 again resumes driving the windup drum, the armature current rises, transistor 55 is turned on, and the discharge path is free for continued speed reduction command.

Operation

Figure 4:
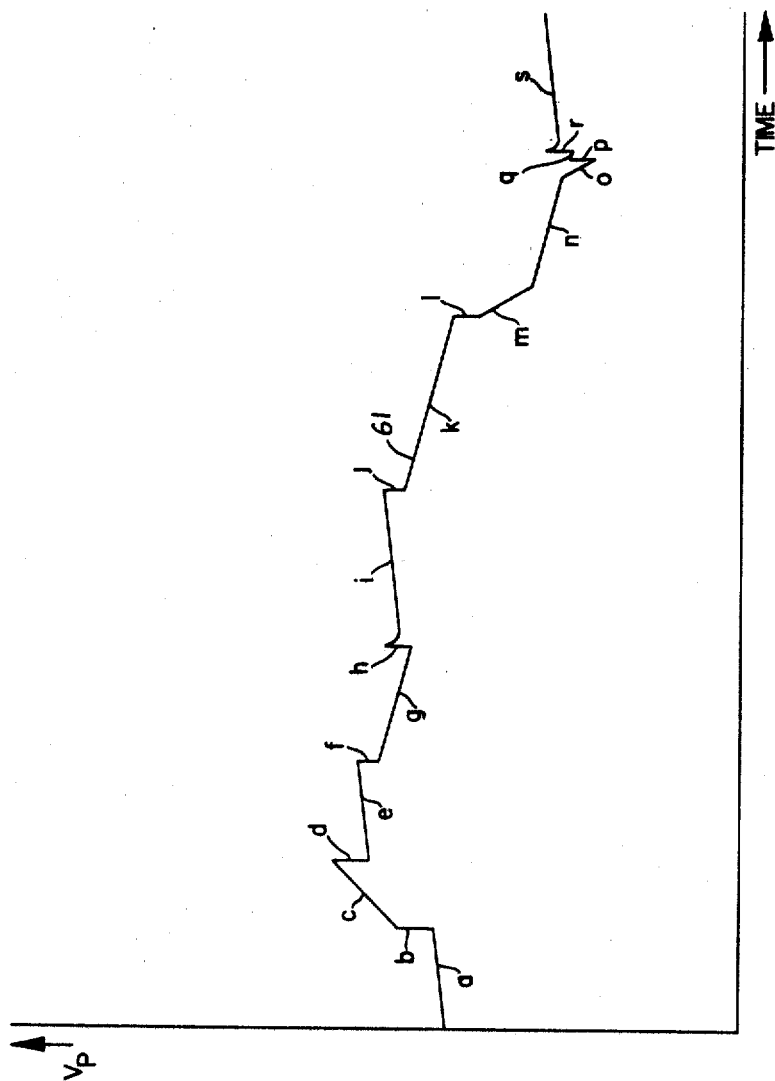
FIGURE 4 is a hypothetical command voltage versus time plot of the feedback control system.

For a better understanding of the feedback control system, resort may be had to FIGURE 4 and the following discussion of a hypothetical sequence of operation. The line graph of this figure shows the voltage at point P, the combined rate of change and step control signals, as it varies with time for assumed operating situations. Each of the steps of the curve 61 is lettered, and these letters serve to indicate the corresponding discussion of the system response at that particular instant. In the following discussion, the lettered steps are interspersed from time to time with different situations which cause the subject sequence of operations.

*Situation.*—Capacitor 31 is being charged for normal operation with shutter 26 fully or partially uncovering cell 2, as shown in FIGURE 2. Cell 1 is covered and cell 3 is uncovered.

(a) A slow rise is experienced as the charge on capacitor 31 via resistor 33 slightly exceeds the discharge via resistor 46.

*Situation.*—A drop in line voltage causes lowered windup speed and the dancer roll drops so that all cells are uncovered.

(b) Cell 1 is turned on and a voltage instantly appears across resistor 32 via current flowing through resistor 38.

(c) Capacitor 31 charges primarily via resistor 36.

*Situation.*—This increased drive has raised the motor speed so that the dancer roll comes up turning cell 1 off.

(d) The voltage across resistor 32 due to the voltage divider relation with resistor 38 is removed as cell 1 is turned off.

(e) Normal operation with the charge on capacitor 31 equaling or slightly exceeding the discharge of this capacitor via resistor 46.

Since the system is subject to many minor variations, operation within the normal domain is not steady but may vary as follows:

*Situation.*—With windup drum buildup there is a constant downward adjustment of the motor speed needed. The dancer roll rises with drum buildup covering cell 2 but not covering cell 3.

(f) There is an instantaneous slight drop in the voltage at P due to the loss of divider voltage across resistor 32 due to resistor 35.

(g) The voltage at P decays via resistor 46.

*Situation.*—The speed of the motor falls off in response to the command and cell 2 is again uncovered as the dancer roll drops.

(h) A sharp, small increase of voltage at P results from the divider action of resistor 35 with resistor 32 and the instantaneous differentiation action of capacitor 39 and resistor 41 with resistor 32.

(i) The voltage contributed by capacitor 39 soon disappears due to the charging of this capacitor and the normal slow charge of capacitor 31 via resistor 33 follows.

*Situation.*—Additional adjustment is needed for the windup drum buildup and the dancer roll rises covering cell 2 but not covering cell 3.

(j) There is an instantaneous slight drop in the voltage at P due to the loss of divider voltage across resistor 32 due to resistor 35.

(k) A decay of voltage at P via resistor 46 follows.

*Situation.*—The increased buildup may not be compensated for by the slow decay of the capacitor 31 via resistor 46 and the dancer roll will rise so that the shutter 26 covers cell 3.

(l) There is an instantaneous drop due to the loss of divider voltage across resistor 32 due to resistor 45.

(m) Capacitor 31 is discharged via resistors 43 and 45. This is in addition to the continuous discharge caused by resistor 46.

*Situation.*—Capacitor 31 is being discharged faster than the inertia of the windup drum will allow the motor speed to fall off. To prevent capacitor 31 from discharging too far when the motor is sluggish in following this slowdown command and to prevent subsequent excessive motor slowdown, the motor armature current is sensed and is used to prevent discharge when the armature current falls to zero, i.e., when the motor is no longer driving the windup drum.

(n) Diode 54 clamps the cathode of diode 52 to a high voltage while transistor 55 is turned off due to substantially zero armature current in the motor. Diode 52 is thus back biased and prevents the fast discharge of capacitor 31 to leave this capacitor subject only to slow discharge via resistor 46.

*Situation.*—The motor has again caught up with the command voltage and begins to drive the windup drum at a lower speed. Armature current again flows turning transistor 55 on and bringing the voltage on diode 54 down.

(o) Capacitor 31 is discharged via resistors 43 and 45.

*Situation.*—The dancer roll drops as the windup slows down uncovering cell 3.

(p) As cell 3 is uncovered, a voltage immediately appears across resistor 32 due to the divider action of resistor 45.

(q) A short period of low discharge via resistor 46 until cell 2 is uncovered.

(r) As cell 2 is uncovered, there is an instantaneous rise in the voltage at P due to the divider action of resistor 35 with resistor 32 and the differentiation action of capacitor 39 and resistor 41 with resistor 32.

(s) The voltage contributed by capacitor 39 quickly disappears due to the charging of this capacitor and the normal slow charge of capacitor 31 via resistor 33 proceeds.

From the above description, it will be recognized that the principles of the present invention may be utilized in control systems for regulating a variety of parameters. Since the switching means can sense voltage, for example, and since the control signal from the summing amplifier is also a voltage, the feedback control system of the present invention may be readily used as a voltage regulator. If the reference voltage is 110 volts, for example, switch 2 would be triggered when the feedback signal indicates the system voltage has deviated slightly from 110 volts. The voltage limits may be 105 volts and 115 volts, and switch 1 or switch 3 is triggered when the feedback indicates the need for fast return as the system voltage approaches these deviation limits.

Even within the confines of a speed control system, many changes can be made. Position deviation need not be sensed. The speed of the motor itself can directly be monitored, and the photocells may be replaced by any nonlinear control element or on-off switch.

It should thus be apparent that the concept of nonlinear selection of the gain in a feedback control system has widespread application to the control of any process or machine where there is a normal range of operation and the rate of return to this range of normal operation is left to the option of the designer. Since various changes and modifications may be made in the practice of the invention herein described without departing from the spirit or scope thereof, it is intended that the foregoing description shall be taken primarily by way of illustration and not in limitation except as may be required by the appended claims.

What is claimed and desired to be secured by Letters Patent of the United States is:

1. A feedback control system comprising a plurality of switch means actuated in response to variations in the system controlled, energy storage means providing a rate of change correction signal, means coupling each of said switch means to said energy storage means, each of said switch means responding to a different range of variation of the system controlled to cause said correction signal to have a different rate of change depending upon which ones of said switch means are actuated.

2. A feedback control system comprising
switch means responsive to variations in the system to be controlled;
energy storage means providing a rate of change control signal;
means coupling said energy storage means to said switch means to supply energy to said energy storage means when said switch means is closed;
conduction means coupled to said energy storage means to continuously drain energy therefrom so that said rate of change control signal is decreased when said switch means is open;
and lead control signal developing means coupled to said switch means to provide a lead control signal when said switch means is closed;
said lead control signal developing means coupling the lead control signal in series with said energy storage means such that the control signal supplied to the system controlled is the combined rate of change control signal and the lead control signal.

3. A feedback control system as recited in claim 1 further including differentiating means coupled to said switch means and said lead control signal developing means to produce a pulse signal when said switch means is closed, said pulse signal forming a further component of the control signal supplied to the system controlled.

4. A feedback control system as recited in claim 1 wherein said energy storage means is a capacitor and said lead signal developing means is a voltage divider, one resistor of which is in series connection with said capacitor.

5. A feedback control system comprising
a plurality of switch means operated in response to variations in the system to be controlled;

energy storage means providing a rate of change control signal;

means coupling said energy storage means to each of said switch means to supply energy to said energy storage means when all switch means are closed and also when selected switch means are closed and to drain energy from said energy storage means when all switch means are open;

lead signal developing means coupled to each of said switch means to provide a lead control signal proportional to the number of switch means closed;

said lead signal developing means coupling the lead control signal in series with said energy storage means such that the control signal supplied to the system being controlled is the combined rate of change control signal and lead control signal.

6. A feedback control system as recited in claim 5 wherein said energy storage means is a capacitor and said lead signal developing means includes a plurality of voltage dividers having a common resistor coupled in series with said capacitor.

7. A feedback control system as recited in claim 5 wherein said plurality of switch means comprises first, second and third switch means and said coupling means determines the rate at which energy is transferred to and from said energy storage means such that said first and third switch means respectively trigger fast buildup and decay of the energy stored by said energy storage means and said second switch means triggers slow buildup of energy storage.

8. A feedback control system as recited in claim 7 further including conduction means coupled to said energy storage means to continuously drain energy therefrom so that said rate of change control signal is decreased at a low rate when said first and second switch means are open and said third switch means is closed.

9. A feedback control system as recited in claim 8 further including differentiating means coupled to said second switch means and said lead signal developing means to produce a pulse signal when said second switch means is closed, said pulse signal forming a further component of the control signal supplied to the system being controlled.

10. A feedback control system as recited in claim 9 wherein the system to be controlled is a motor drive system and said switch means are photoelectric cells controlled by means responsive to variations in the speed of the motor.

11. A feedback control system as recited in claim 10 further including means responsive to the motor armature current and coupled to said energy storage means to arrest the drain of energy therefrom when all of said photoelectric cells are not conducting so long as the armature current is substantially zero.

References Cited

UNITED STATES PATENTS

| | | | |
|---|---|---|---|
| 2,668,264 | 2/1954 | Williams | 318—28 |
| 2,771,573 | 11/1956 | Blomquist et al. | |
| 3,035,219 | 5/1962 | Friedman | 320—1 |
| 3,070,778 | 12/1962 | Werme | 320—1 X |
| 3,088,064 | 4/1963 | Anger | 320—1 |
| 3,219,936 | 11/1965 | Eksten et al. | |
| 3,286,127 | 11/1966 | Henry | 320—1 X |
| 3,354,390 | 11/1967 | Green et al. | 320—1 X |

ORIS L. RADER, *Primary Examiner.*

B. A. COOPER, *Assistant Examiner.*

U.S. Cl. X.R.

318—6, 18; 320—1